United States Patent [19]

Falcetta et al.

[11] Patent Number: 4,640,965
[45] Date of Patent: Feb. 3, 1987

[54] HYDROGEL COMPOSITIONS USING P-(2-HYDROXYHEXAFLUOROISOPROPYL) STYRENE AS A COMONOMER

[75] Inventors: Joseph J. Falcetta; Joonsup Park, both of Arlington, Tex.

[73] Assignee: Alcon Laboratories, Inc., Fort Worth, Tex.

[21] Appl. No.: 816,768

[22] Filed: Jan. 7, 1986

[51] Int. Cl.$^4$ .............................................. C08F 12/20
[52] U.S. Cl. .................................. 526/242; 523/106; 524/544; 526/249
[58] Field of Search ................ 526/242, 249; 523/106; 524/544

[56] References Cited

U.S. PATENT DOCUMENTS

| | | | |
|---|---|---|---|
| 3,179,640 | 4/1965 | Middleton | 526/242 |
| 3,220,960 | 11/1965 | Wichterle et al. | 260/2.5 |
| 3,499,862 | 3/1970 | Wichterle | 523/106 |
| 4,095,877 | 6/1978 | Stoy et al. | 351/160 |
| 4,433,111 | 2/1984 | Tighe et al. | 525/326.2 |
| 4,436,887 | 3/1984 | Chromecek et al. | 526/263 |
| 4,440,919 | 4/1984 | Chromecek et al. | 526/263 |
| 4,451,630 | 5/1984 | Atkinson et al. | 526/261 |
| 4,492,776 | 1/1985 | Atkinson et al. | 526/261 |
| 4,528,325 | 7/1985 | Ofstead | 525/60 |

OTHER PUBLICATIONS

Pearce, et al, "Polymer Compatibilization Through Hydrogen Bonding", *Journal of Macromolecular Science-Chemistry*, A21, pp. 1181–1216, (1984).

*Primary Examiner*—Paul R. Michl
*Attorney, Agent, or Firm*—James A. Arno; Gregg C. Brown

[57] ABSTRACT

Hydrogel compositions characterized by a copolymer composition which includes a hydroxyfluoroalkylstyrene as a comonomer. The preferred comonomer compound is p-(2-hydroxyhexafluoroisopropyl)-styrene [HFIS].

21 Claims, No Drawings

HYDROGEL COMPOSITIONS USING P-(2-HYDROXYHEXAFLUOROISOPROPYL) STYRENE AS A COMONOMER

BACKGROUND OF THE INVENTION

This invention relates to novel hydrogels that contain as a comonomer a hydroxyfluoroalkylstyrene and in a most preferred embodiment p-(2-hydroxyhexafluoroisopropyl) styrene (HFIS). Hydrogels are usually defined as natural or synthetic polymeric systems that contain approximately from about 10% to about 90% water in an equilibrium state. In general the physical properties of hydrogels are determined to a large extent by their water content. Due to their excellent biocompatability there has been extensive interest in hydrogels as biomedical devices. Thus there have been investigations on the use of hydrogels as contact lenses, intrastromal implants, intraocular lenses, coatings on numerous devices, membranes of several types, tissue replacement, ureter prosthesis, breast augmentation, etc. To date, the most commercial success has been found in the field of ophthalmology, and most particularly, soft contact lenses.

Hydrogel type contact lenses have been known, since at least as early as Wichterle et al, U.S. Pat. No. 3,220,960 which discloses a hydrogel which involves a hydrated polymer of an hydroxyalkyl acrylate or methacrylate cross-linked with a corresponding diester. Such gels may contain from about 10% to about 90% by weight water, preferably from about 30% to about 50% by weight water. Of the monomers used to prepare such hydrogels, 2-hydroxyethyl methacrylate is most commonly used. The equilibrium water content of lightly cross-linked poly (2-hydroxyethyl methacrylate) is about 40%. These hydrogels are often referred to as low water content hydrogels.

Another commonly used hydrogel system is based on copolymers of vinyl pyrrolidone and methyl methacrylate. The equilibrium water content of these hydrogels can vary widely as a function of the ratio of vinyl pyrrolidone to methyl methacrylate. However, most hydrogels of commercial interest have a water content in the 70% to 80% by weight range. These hydrogels are often referred to as high water content hydrogels.

As a general rule the low water content hydrogels have acceptable mechanical properties for application as a soft contact lens. However, they do not have acceptable oxygen permeability (DK) to be used as an extended wear contact lens. Also, as a general rule the high water content hydrogels appear to have acceptable oxygen permeability for application as an extended wear contact lens but have poor mechanical properties, i.e., are not easily formed into stable lenses, are tearable, sometimes lack visual acuity, and are easily damaged.

For many other biomedical applications it is also apparent that the utility of hydrogels have been limited by a lack of suitable mechanical properties. Accordingly, there is a real and continuing need to develop hydrogels which have improved mechanical properties and maintain the other desirable features of hydrogels such as biocompatibility, softness, transparency, and permeability to oxygen and other metabolites. The primary object of this invention is to fill this need.

It is a more specific objective of the present invention to prepare hydrogel type contact lenses of improved mechanical properties which have good optical properties and acceptable oxygen permeability. This objective is achieved by the copolymerization of a hydrogel forming monomer (or monomers) and a hydroxyfluoro alkylstyrene, preferably p-(2-hydroxyhexafluoroisopropyl) styrene (HFIS).

SUMMARY OF THE INVENTION

According to the present invention there is provided a hydrogel of a copolymer of a hydrophilic monomer (or monomers) and a hydroxyfluoroalkylstyrene, the most preferred being HFIS.

For the most part the remaining description is given with reference to HFIS, but it is to be understood this is for brevity and that unless othewise stated, or specifically referring to HFIS as the preferred embodiment, other hydrofluoroalkylstyrenes may be employed in lieu of HFIS.

Similarly, in the remaining description, reference is made to HEMA hydrogels, but it is to be understood this is for brevity and that unless otherwise stated, or specifically referring to HEMA hydrogels, other hydrophilic monomers may be employed in lieu of HEMA.

DETAILED DESCRIPTION OF THE INVENTION

Polymer hydrogels are widely used for biomedical applications such as contact lenses and a large number of hydrogels of this type are based on the polymers described in U.S. Pat. No. 3,220,960 (Wichterle et al), whose disclosure as it relates to hydrogel monomers is incorporated herein by reference. Wichterle's polymers are hydroxy (lower alkyl $C_1$ to $C_8$) methacrylates or acrylates, cross-linked with a small percentage of the corresponding diester, e.g., ethylene glycol dimethacrylate (EGDMA). Polymers based upon hydroxyethyl methacrylate (HEMA) and cross-linked with EGDMA can be hydrated to form clear hydrogels having good mechanical properties.

As earlier mentioned, a degree of cross-linking in a copolymer is necessary to form a three dimensional polymer network structure. Typically one uses about 0.2% by weight of the composition to about 5% by weight of the composition of cross-linking comonomer. Various cross-linking comonomers may be employed such as glycol diacrylates, glycol dimethacrylates, like EGDMA including ethylene and propylene glycol diacrylates and dimethacrylates, polyethylene glycol diacrylates and dimethacrylates, allyl methacrylates, etc.

According to one aspect of the present invention there is provided a hydrogel which comprises a copolymer of a hydroxy lower ($C_1$ to $C_8$) alkyl methacrylate or acrylate with HFIS, the amount of hydroxy lower alkyl methacrylate or acrylate being from about 40% to about 95%, and the amount of HFIS being from 5% to 60% of the total polymer composition, preferably the hydroxy lower alkyl methacrylate, or acrylate is from about 70% to about 90% and the HFIS from 10% to 30% of the total polymer composition. These percentages are on a total polymer weight basis and exclude added water.

The copolymerizeable hydroxy lower alkyl ($C_1$ to $C_8$) methacrylate or acrylate need not be described herein in detail, such hydrogel forming monomers being well-known and described previously in the earlier incorporated-by-reference Wichterle U.S. Pat. No. 3,220,960. As those skilled in the art know, the hydrogel monomer may also contain other comonomers such as vinyl pyrrolidone. The amount of the hydrogel monomer has previously been specified.

With regard to the amount of copolymerizable hydroxyfluoroalkylstyrene, such as p-(2-hydroxyhexafluoroisopropyl) styrene (HFIS), again, the amount on a weight basis of the total copolymer, exclusive of the added water has been previously specified, i.e. from about 10% by weight to about 30% by weight on a preferred basis and in a broader aspect from about 5% to about 60% by weight of the total polymer composition.

In accordance with this invention an hydroxyfluoroalkylstyrene, such as HFIS, or chemically p-(2-hydroxyhexafluoroisopropyl) styrene may be added as a comonomer to the other more conventional hydrogel monomer compositions to prepare a hydrogel of improved mechanical properties. As earlier mentioned, other hydroxyfluoroalkylstyrenes besides HFIS, generally of the type disclosed in U.S. Pat. No. 3,179,640 can be used herein. The disclosure of U.S. Pat. No. 3,179,640, patented Apr. 20, 1965, to the extent of its general description of hydroxyfluoroalkylstyrene monomers, their formulas and their method of preparation is specifically incorporated herein by reference. The hydroxyfluoroalkylstyrenes shown in that patent may have the following general formula:

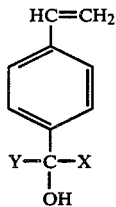

wherein X and Y are, individually, the same or different monovalent fluoroalkyl, including perfluoroalkyl, ω-hydroperfluoroalkyl and ω-chloroperfluoroalkyl, radicals, or jointly, a divalent perfluoroalkylene radical. Preferable for this invention X and Y are $C_1$ to $C_8$ alkyl, and most preferred $C_1$ to $C_3$ alkyl. There is no disclosure of any utility of HFIS monomers in the incorporated-by-reference U.S. Pat. No. 3,179,640 as useful in polymeric compositions for biomedical devices, in particular, as monomers or comonomers for use in preparation of ophthalmic lenses, and in particular contact lenses.

The monomer, p-(2-hydroxyhexafluoroisopropyl) styrene (HFIS) has merely been described in U.S. Pat. No. 3,179,640 as yielding polymers and copolymers having unusual swelling characteristics and solvent resistance properties. Uses there mentioned include the use of such polymers and copolymers as coatings, molded articles and clarifying agents in solvent-cast polyamide films. There is also mention in the literature, as exemplified by the article by Pearce et al, *Journal of Macromolecular Science-Chemistry*, A21, 1181–1216 (1984), of the use of HFIS as a comonomer to effect polymer compatibilization through hydrogen bonding. Thus, the monomer per se has been known in the literature for many years. However, the ability of HFIS to form hydrogels and more specifically hydrogels of exceptional mechanical properties has not been considered nor has the use of such copolymers as biomedical devices and specifically biomedical devices for ophthalmic applications ever been suggested. It is the combination to which the present invention is directed.

The preferred HFIS monomer has the formula:

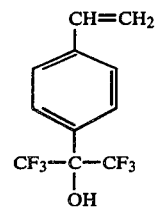

The following properties of HFIS make it the most preferred hydroxyfluoroalkylstyrene compound for use in hydrogel forming copolymers intended for biomedical applications, and specifically for ophthalmic applications, in accordance with this invention. The pKa of HFIS is ~5.5 compared to the ~4.8 found with acrylic acid type comonomers. The index of refraction ($n_D^{25}$) of HFIS is 1.4577 compared to 1.4290 for methacrylic acid. The oxygen permeability (DK) of the homopolymer is $2.3 \times 10^{-11}$; and the presence of the fluorine substituents may significantly reduce interaction with biological fluids such as tears.

The properties of hydrogels containing HFIS are unique and unexpected. There have been many attempts in the prior art to improve the mechanical properties of hydrogels. However, these have been restricted to specific systems and are not based on the use of a comonomer that can improve the mechanical properties of hydrogels via incorporation by a copolymerization mechanism. Thus for example, Ofstead in U.S. Pat. No. 4,528,325 claims hydrogels of high strength based on the solvolysis of copolymers of vinyl trifluoroacetate (VTA) and up to 5% of certain comonomers such as vinyl esters or disubstituted ethylene monomers. These copolymers appear to have improved mechanical properties, however, unlike the HFIS copolymers they require the extra step of a reaction on a polymer and of course are very limited in compositions as they require the presence of at least 95% vinyl trifluoroacetate.

Another attempt at preparing high strength hydrogels is that of Stoy et al, is exemplified by U.S. Pat. No. 4,095,877. In this technique polymers or copolymers containing acrylonitrile are hydrolyzed to form high strength hydrogels. This technique also requires a reaction on a polymer and is far more limited in its scope than the present use of HFIS to improve the strength of hydrogels of varying compositions. Thus it can be seen that the copolymers of the present invention have distinct advantages. In short, while there are numerous reported attempts to improve mechanical properties that involve very specific hydrogel systems or a very narrow range of compositions, see e.g. U.S. Pat. Nos. 4,492,776, 4,451,630, 4,440,919, 4,436,887, and 4,433,111, none of these patents describe systems that have the wide applicability or range of mechanical properties that are found with hydrogels based on copolymers incorporating HFIS. It can thus be seen that the present hydrogels not only may improve mechanical properties but also are advantageous in the wide range of hydrogels that can be prepared.

With regard to the portion of the copolymer which comprises the hydrogel, it should be understood that it may comprise not only the hydroxy lower $C_1$ to $C_8$ alkyl methacrylate or acrylate, but that other hydrophilic monomers may be part of the 40% to 95%, or the preferred 70% to 90%. Those other hydrophilic monomers are known, often used in making hydrogel type soft lenses, and described in the earlier mentioned hydrogel patents.

Examples of another class of useable and suitable hydrophilic monomers are the N-vinyl heterocyclic monomers, suitable examples of such monomers being N-vinyl-2-pyrrolidone, N-vinyl pyridine and N-vinyl-ε-caprolactam. Also another class of hydrophilic monomers are the polymerizable olefinic acids and amides; suitable examples being acrylic acid, methacrylic acid, itaconic acid, fumaric acid, maleic acid, crotonic acid, acrylamide, methacrylimide and N-(1,1-dimethyl-3-oxabutyl acrylamide). Another suitable group of hydrophilic monomers are the lower alkyl vinyl ethers such as methyl and ethyl vinyl ether.

As heretofore mentioned, certain ranges of cross-linking monomers 0.1% to 5% may also be employed. These may be used to harden the resulting copolymer or to improve machineability or stability, or both. Examples of suitable cross-linking monomers are divinyl benzene, di- and higher functionality methacrylates and acrylates such as ethylene glycol dimethacrylate, tetraethylene glycol dimethacrylate, polyethylene glycol dimethacrylate, trimethylol propane trimethylacrylate, pentaerythritol tetramethacrylate, and allyl methacrylate, allyl itaconate, diallyl itaconate, diallyl adipate and methylenebisacrylamide. The foregoing examples of cross-linking monomers are merely illustrative, other known polymer cross-linkers may also be used, and all may be used individually, or in combination.

In addition to each of the above described amounts of hydrophilic monomer, and cross-linking agent, one may optionally include from 0% to 40% of a hydrophobic monomer such as methyl methacrylate, cyclohexyl methacrylate, styrene, tertiary butyl styrene, etc. The hydrophobic monomers which will modify the mechanical properties and other hydrophobic monomers mentioned in the previously referred to parent application may also be employed.

The following examples are offered to further illustrate, but not necessarily limit the process and composition of the present invention.

EXAMPLE

Films of the composition as shown in Table I below were prepared between (4×4 in.) glass plates. The glass plates were pretreated with dimethyldichlorosilane and hydrolyzed to silanize the surface. Masking tape was placed around the edges of a glass plate to control the film thickness (target thickness was usually 0.1 mm). The monomer mix was placed on a glass plate, the two plates secured together by means of a metal clip and the assembly placed in an oven at 50° C. for one and one half hour. At the end of this time the glass plate assembly was heated to 90° C. for an additional 90 minutes. The thin film was then removed from the glass plate assembly and stored in distilled water (phosphate buffer, pH 7.4). For all of the copolymers listed in Table I, 1.0 weight % of USP 245 (2,5-dimethyl-2,5-diperoxyl-2'-ethylhexoate hexane) was added.

Oxygen permeability (DK) was measured in a water/water cell using an $O_2$ Permeometer TM Model 101T. The units of DK are cm$^2$/sec (mlO$_2$/ml mmHg)×10$^{-11}$. Mechanical properties were measured using an Instron TM universal testing instrument, Model 1122. Tests were carried out with the test specimen in a water bath. The units of tensile strength and modulus are Kg/cm$^2$.

TABLE I

|  | A | B | C |
|---|---|---|---|
| HEMA | 100 | 90 | 80 |
| HFIS | — | 10 | 20 |
| H$_2$O Content (%) | 35 | 27 | 20 |
| DK | 9.8 | 5.1 | 2.7 |
| Tensile Strength | 9.0 | — | 70 |
| Modulus | 11 | — | 1,200 |
| % Elongation | 140 | — | 200 |
| Index of Refraction | 1.438 | 1.457 | 1.472 |

The oxygen permeability of the HFIS copolymers was not as high as expected. The decrease is ascribed to the decrease in water content. However, there was a dramatic increase in physical properties, far beyond that which would necessarily be expected. Moreover, the index of refraction of the copolymer gels was higher than expected based only on reduced water content, i.e. 1.472 compared to 1.466 (calculated). The evidence shows that excellent hydrogel compositions useful for contact lenses can be prepared.

When the above examples are repeated with hydroxy perfluoro $C_1$ to $C_8$ alkyl sytrenes, at similar levels of addition, substantially similar results can be obtained in that good hydrogel materials are obtained having improved mechanical properties. These materials may be used to formulate hydrogel type soft contact lenses having the same properties as demonstrated by the polymer films.

What is claimed is:

1. A hydrogel polymeric material based on copolymers comprising from about 40% to about 95% of a comonomer or comonomers that will form a hydrogel and from about 5% to about 60% by weight of a hydroxyfluoroalkyl styrene monomer of the formula:

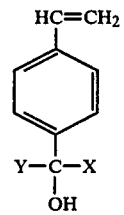

wherein X and Y are individually the same or different monovalent fluoroalkyl, each selected from the group consisting of perfluoroalkyl, ω-hydrofluoroalkyl, and ω-chloroperfluoroalkyl radicals wherein the alkyl or X and Y is $C_1$ to $C_8$, or jointly a divalent perfluoroalkylene radical.

2. The hydrogel of claim 1 wherein X and Y are hydroperfluoro wherein the alkyl of X and Y is $C_1$ to $C_8$.

3. The hydrogel of claim 2 wherein X and Y are hydroperfluoro wherein the alkyl of X and Y is $C_1$ to $C_3$.

4. The hydrogel of claim 1 wherein the hydroxyfluoroalkyl sytrene monomer is [p-(2-hydroxyfluoroisopropyl)styrene] p-(2-hydroxyhexafluoroisopropyl)styrene.

5. The hydrogel of claim 1 wherein the amount of hydroxyfluoroalkyl styrene is from about 10% to about 30% by weight of said hydrogel.

6. The hydrogel of claim 1 wherein the hydrogel forming monomer is hydroxyalkyl acrylate or methacrylate of a lower $C_1$ to $C_8$ alkyl.

7. The hydrogel of claim 6 wherein the hydroxy alkyl monomer is hydroxyethyl methacrylate.

8. The hydrogel of claim 1 wherein the hydroxyalkyl acrylate or methacrylate is from about 70% to 90% by weight of said hydrogel.

9. The hydrogel of claim 1 wherein the hydrogel forming monomer is N-vinyl pyrrolidone.

10. The hydrogel of claim 1 which includes from about 0.1% to about 5% cross-linking agent.

11. The hydrogel of claim 1 which includes from about 0% to about 40% of a properties modifying organic hydrophobic monomer selected from the group consisting of $C_1$ to $C_8$ alkyl methacrylates and acrylates, cycloalkyl methacrylates and acrylates, styrene, t-butyl styrene and other ring substituted alkyl styrenes.

12. The hydrogel of claim 1 wherein the hydrophobic monomer is methyl methacrylate.

13. The hydrogel of claim 12 wherein the methyl methacrylate is present in an amount from 15% to 30% of said material.

14. A contact lenses comprising from about 40% to about 95% of a comonomer of comonomers that will form a hydrogel and from about 5% to about 60% by weight of a hydrozyfluoroalkyl styrene monomer of the formula:

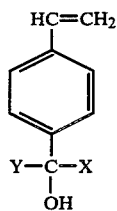

wherein X and Y are each selected from the group consisting of perfluoroalkyl, ω-hydrofluoroalkyl, and ω-chloroperfluoroalkyl radicals wherein the alkyl of X and Y is $C_1$ to $C_8$, or jointly a divalent perfluoroalkylene radical.

15. The contact lens of claim 14 wherein X and Y are hydroperfluoro wherein the alkyl of X and Y is $C_1$ to $C_8$.

16. The contact lens of claim 15 wherein X and Y are hydroperfluoro wherein the alkyl of X and Y is $C_1$ to $C_3$.

17. The contact lens of claim 14 wherein the hydroxyfluoroalkyl sytrene monmer is [p-(2-hydroxyfluoroisopropyl)styrene] p-(2-hydroxyhexafluoroisopropyl)styrene.

18. A method of perparing a contact lens of the hydrogel type which has improved mechanical properties, said method comprising:

copolymerizing with a monomer that is capable of forming a hydrogel, from about 40% to about 95% by weight of a comonomer or comonomers that will form a hydrogel and from about 5% to about 60% by weight of a hydroxyfluoroalkyl styrene monomer of the formula:

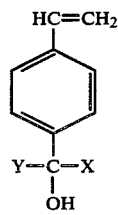

wherein X and Y are each selected from the group consisting of perfluoroalkyl, ω-hydrofluoroalkyl, and ω-chloroperfluoroalkyl radicals wherein the alkyl of X and Y is $C_1$ to $C_8$, or jointly a divalent perfluoroalkylene radical.

19. The method of claim 18 wherein X and Y are hydroperfluoro wherein the alkyl of X and Y is $C_1$ to $C_8$.

20. The method of claim 19 wherein X and Y are hydroperfluoro wherein the alkyl of X and Y is $C_1$ to $C_3$.

21. An intraocular lens comprised of the hydrogel polymeric material of claim 1.